United States Patent [19]

Bayer

[11] 3,796,952

[45] Mar. 12, 1974

[54] FREQUENCY-SELECTIVE CALIBRATED AMPLITUDE-MEASURING SYSTEM

[75] Inventor: Herbert Bayer, Reutlingen, Germany

[73] Assignee: Wandel u. Goltermann, Reutlingen, Germany

[22] Filed: Apr. 24, 1972

[21] Appl. No.: 246,950

[30] Foreign Application Priority Data

Apr. 23, 1971 Germany.................... P 21 19 898.1

[52] U.S. Cl..................................... 324/130, 324/74
[51] Int. Cl............................ G01r 1/02, G01r 1/38
[58] Field of Search....... 324/130, 74, 120; 325/363

[56] References Cited
UNITED STATES PATENTS 3,461,385  8/1969  Bayer................................. 324/130
3,486,112  12/1969  Bayer................................. 324/130

Primary Examiner—Gerard R. Strecker
Assistant Examiner—Ernest F. Karlsen
Attorney, Agent, or Firm—Karl F. Ross; Herbert Dubno

[57] ABSTRACT

An incoming signal voltage of frequency $f_e$, whose amplitude is to be measured, is additively heterodyned in a first mixer with a locally generated variable test frequency $f_t$ to provide a first beat frequency $f_{i1} = f_e + f_t$ clearing a first filter with a pass band including that beat frequency. In a second mixer, preceding a second filter with a narrow pass band centered on a second beat frequency $f_{i2}$, the first beat frequency $f_{i1}$ is subtractively heterodyned with a locally generated ancillary frequency $f_c$ of magnitude $f_{i1} - f_{i2}$ to provide the frequency $f_{i2}$ which passes the second filter and reaches an amplitude indicator through an adjustable amplifier or attenuator. In a calibrating position, a fixed reference frequency $f_o = f_{i2}$ from a local oscillator is substituted for the input frequency $f_e$ whereas the test frequency $f_t$ is replaced by the ancillary frequency $f_c$ in the first mixer.

6 Claims, 1 Drawing Figure

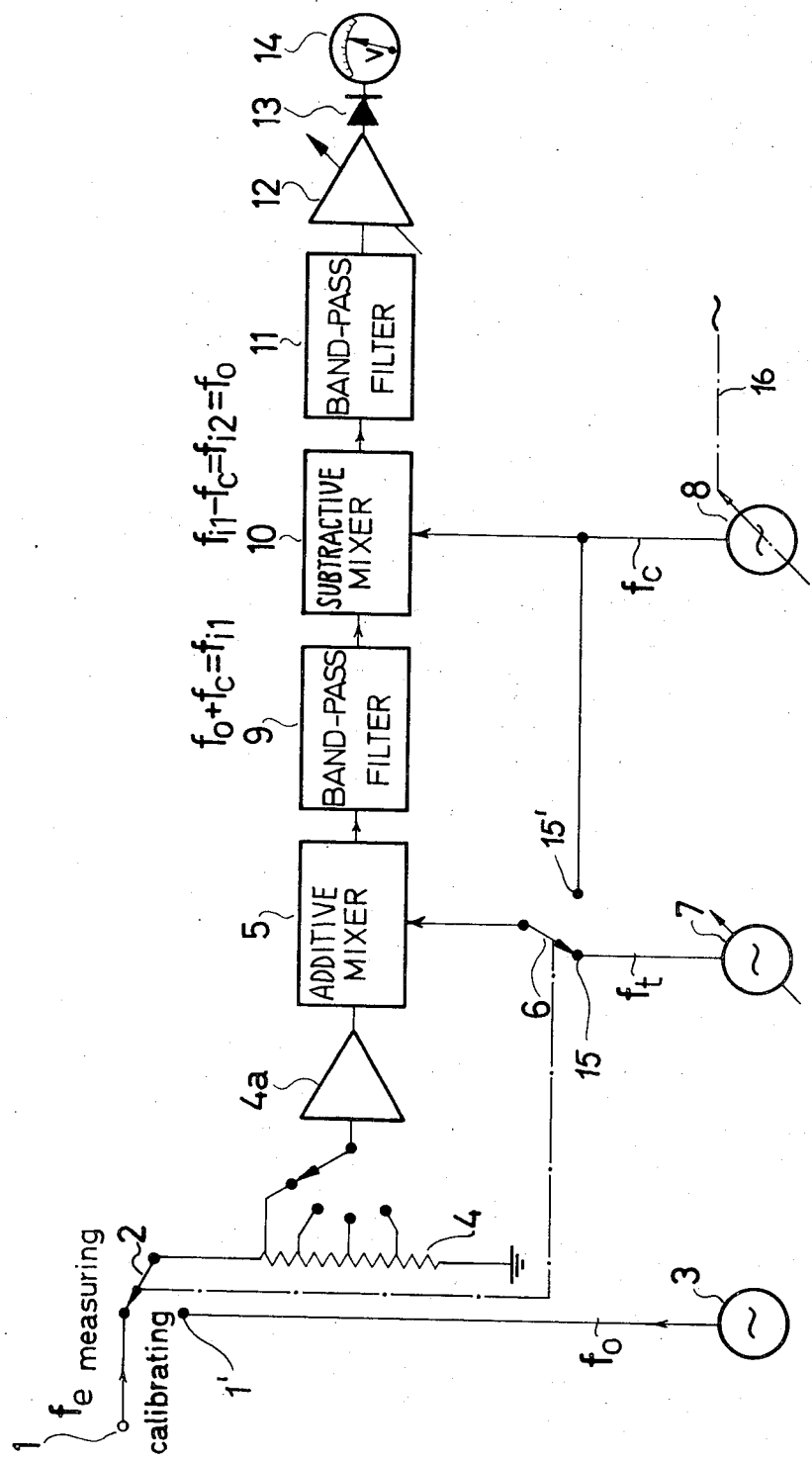

FREQUENCY-SELECTIVE CALIBRATED AMPLITUDE-MEASURING SYSTEM

SPECIFICATION

My present invention relates to a calibrating and measuring system of the general type described in my prior U.S. Pat. Nos. 3,461,385 and 3,486,112.

In such a system, an incoming signal wave of mixed or varying frequency is fed to a selector circuit which passes a desired frequency component to a detector to energize an amplitude indicator such as a voltmeter; between samplings of this signal wave the system may be manually or automatically changed by an entrance switch from its measuring position to a calibrating position in which a reference frequency ($f_o$) travels over the same path to a control stage operable to adjust its gain or attenuation, if necessary, so as to set the indicator to a suitable reference value. The amplitude-adjusting means of the control stage may include, for example, a digital attenuator of the type disclosed in commonly owned U.S. Pat. No. 3,584,295.

In certain embodiments disclosed in my two prior patents identified above, use is made of two mixers which are connected in cascade during calibration to synthesize in the first mixer the reference frequency ($f_o$) from a fixed base frequency and a variable test frequency ($f_t$), this test frequency being applied to the second mixer for generating an invariable output frequency which traverses a filter of narrow pass band to reach the control stage and the indicator. In the measuring position of the entrance switch, the first mixer is disconnected and the incoming signal voltage, whose amplitude is to be measured, is fed to the second mixer via the selector circuit receiving the variable test frequency in order to generate a beat frequency of suitable magnitude whenever the input frequency ($f_e$) bears a predetermined relationship with the selected test frequency, i.e. when the difference between the two frequencies $f_e$ and $f_t$ equals the pass frequency of the filter. In order to facilitate calibration, this pass frequency must equal the fixed base frequency fed to the first mixer.

A drawback of the prior systems is the need for driving the second mixer with two widely varying frequencies, namely the input frequency $f_e$ and a test frequency $f_t$, thus requiring a high degree of linearity in that mixer over a large frequency range.

The general object of my present invention is to provide an improved and simplified circuit arrangement for carrying out the measurements and calibrations described in my earlier patents.

A more particular object is to provide a system of this nature wherein the second mixer receives, upon measuring as well as during calibration, a substantially constant heterodyning frequency which, however, need not be precisely stabilized and which could in fact be modulated within certain limits ("wobbled") to determine the attenuation level throughout a selected frequency band.

These objects are realized, in accordance with my present invention, by the provision of a first oscillator generating the fixed reference frequency $f_o$, a second oscillator generating the variable test frequency $f_t$, and a source of ancillary frequency $f_c$ which may be either constant or modulated as noted above. In the measuring position of the associated entrance switch, which may be manually or automatically operated, the input frequency $f_e$ to be tested is isolated in the first one of the two mixers which are permanently connected in cascade, in contradistinction to the systems of my prior patents where the first mixer intervenes only during calibration. The two mixers have opposite functions, one of them (preferably the first one) delivering the sum and the other delivering the difference of the two frequencies algebraically combined therein. In the measuring position of the entrance switch, the first mixer receives the test frequency $f_t$ in order to synthesize a first intermediate or beat frequency $f_{t1}$ which, with additive mixing at that stage, is equal to $f_e + f_t$; this first beat frequency is extracted by a first band-pass filter which need not have a very narrow pass band and can therefore be of rather simple construction. In the same measuring position, as well as in the alternate calibrating position, the second mixer receives the beat frequency $f_{t1}$ together with locally generated ancillary frequency $f_c$ to generate a second beat frequency $f_{t2}$ adapted to pass a second, narrow-band filter in the output of the second mixer. During calibration, the first mixer is fed the same ancillary frequency $f_c$ in lieu of the variable test frequency $f_t$ and is supplied with the fixed reference frequency $f_o$ replacing the input frequency $f_e$. Thus, the first beat frequency $f_{t1} = f_e + f_t$ must also equal the sum of the two locally generated frequencies $f_o$ and $f_c$ whence $$f_{t1} = f_e + f_t = f_o + f_c. \tag{1}$$

If the first mixer operated as a subtractor and the second one were connected as an adder, equation No. (1) becomes $$f_{t1} = f_e - f_t = f_o - f_c. \tag{1'}$$

In either case, therefore, the relationship between the applied test frequency $f_t$ and the selected input frequency $f_e$ is defined by the values of frequencies $f_o$ and $f_c$, being invariable if not only $f_o$ but also $f_c$ is constant. If, however, $f_c$ is modulated, the selected input frequency $f_e$ varies in the same rhythm for a given test frequency $f_t$.

The beat frequency $f_{t2}$ of the second mixer always equals the reference frequency $f_o$. In the preferred case, in which the additive mixer is the first stage, equation (1) yields $$f_o = f_{t2} = |f_{t1} - f_c|; \tag{2}$$

the absolute value indicates that the ancillary frequency $f_c$ may be either larger or smaller than the pass frequency $f_{t1}$.

The above and other features of the invention will be described in detail hereinafter with reference to the accompanying drawing the sole FIGURE of which diagrammatically shows a measuring and a calibrating system according to my present improvement.

The system shown in the drawing comprises an input terminal 1 receiving a signal voltage of frequency $f_e$; another input terminal 1' is connected to a local oscillator 3 of fixed output frequency $f_o$ representing the aforementioned reference frequency.

A switch arm 2, engaging the terminal 1 in a measuring position and the terminal 1' in a calibrating position, works into a voltage divider 4 supplying through an amplifier 4a a first mixer 5 here shown to be of the additive type, i.e., with its lower sideband suppressed. Mixer 5 has another input connected, through a switch arm 6 ganged with switch arm 2, to either of two terminals 15, 15' respectively connected to a variable oscillator 7, generating a test frequency $f_t$, and to a further oscillator 8, producing an ancillary frequency $f_c$. A band-pass filter 9 in the output of mixer 5 passes a first beat frequency $f_{t1}$ which equals $f_e + f_t$ in the illustrated measuring position and $f_o + f_c$ in the alternate calibrating position. This beat frequency is fed, through a nonillustrated further amplifier, to a second mixer 10 connected as a subtractor (upper sideband suppressed) which has another input permanently connected to oscillator 8. Thus, mixer 10 generates a second beat frequency $f_{t2} = f_{t1} - f_c$ which, from the relationships expressed in equations (1) and (2), will be found equal to the reference frequency $f_o$. A second band-pass filter 11, whose pass band is narrowly centered on this beat frequency $f_{t2} = f_o$, works through an adjustable amplifier 12 into an output stage including a rectifier 13 and a voltage indicator 14. Variable amplifier 12 serves to adjust the reading of indicator 14 to a suitable reference value in the calibrating position.

As schematically indicated at 16, the output frequency $f_c$ of oscillator 8 may be modulated to indicate the amplitude of the input voltage, and therefore the attenuation of a test circuit through which that voltage is applied to terminal 1, within a certain frequency band centered on a value selected with the aid of test frequency $f_t$.

Representative but nonlimiting values for the fixed or limitedly variable frequencies of the illustrated system are 1 kHz for $f_o = f_{t2}$, 400 kHz (or 8 mHz) for $f_{t1}$, and 401 kHz (or 8.01 mHz) for $f_c$. Thus, the use of an additive first and a subtractive second mixer stage enables the measuring and calibration to be carried out at a relatively low frequency level, with reference frequency $f_o$ (and therefore beat frequency $f_{t2}$) a small fraction of the mean value of ancillary frequency $f_c$ and beat frequency $f_{t1}$.

The pass band of filter 11 may have a width of only a few Hz; since the same heterodyning frequency $f_c$ is fed to both filters 9 and 10 during calibration, stability of this frequency is not a factor and no allowance in bandwidth need be made for possible deviations.

I claim:

1. A circuit arrangement for giving a calibrated amplitude reading of an alternating signal voltage of selected frequency, comprising:

a first oscillator generating a fixed reference frequency $f_o$;

a second oscillator generating a widely variable test frequency $f_t 1$ a source of at most limitedly variable ancillary frequency $f_c$;

additive mixer means and subtractive mixer means connected in cascade;

switch means having a measuring position for applying to a first one of said mixer means said test frequency $f_t$ and an input frequency $f_e$ of an incoming signal voltage, thereby generating a first beat frequency $f_{t1} = f_e \pm f_t$ upon said test frequency $f_t$ bearing a predetermined relationship with said input frequency $f_e$, said switch means further having a calibrating position for applying to the first mixer means said reference frequency $f_o$ and said ancillary frequency $f_c$ to synthesize said first beat frequency $f_{t1}$ therefrom;

a first band-pass filter, with a pass band including said first beat frequency $f_{t1}$, connected between said first mixer means and the second mixer means for delivering to the latter said first beat frequency $f_{t1}$, said second mixer means being further connected to said source for receiving therefrom in each of said positions said ancillary frequency $f_c$ to generate a second beat frequency $f_{t2} = f_o$;

a second band-pass filter, with a narrow pass band centered on said second beat frequency $f_{t2}$, connected in the output of said second mixer means for receiving therefrom said second beat frequency $f_{t2}$;

amplitude-indicating means connected to said second mixer means for receiving said second beat frequency $f_{t2}$ therefrom; and amplitude-adjusting means between said second mixer means and said amplitude-indicating means for setting same, in said calibrating position, to a selected reference value.

2. A circuit arrangement as defined in claim 1 wherein said additive mixer means is said first mixer means.

3. A circuit arrangement as defined in claim 2 wherein the magnitude of said reference frequency $f_o$ is a small fraction of that of said ancillary frequency $f_c$.

4. A circuit arrangement as defined in claim 1, further comprising adjustable step-down means for the amplitude of said signal voltage inserted between said switch means and said first mixer means.

5. A circuit arrangement as defined in claim 1 wherein said source is a fixed third oscillator.

6. A circuit arrangement as defined in claim 1 wherein said source comprises a variable oscillator provided with frequency-modulating means.

* * * * *